(12) United States Patent
Isami et al.

(10) Patent No.: US 12,522,084 B2
(45) Date of Patent: *Jan. 13, 2026

(54) ELECTRIC VEHICLE HAVING SYNTHESIZED INTERNAL COMBUSTION ENGINE SOUND

(71) Applicant: TOYOTA JIDOSHA KABUSHIKI KAISHA, Toyota (JP)

(72) Inventors: Yoichiro Isami, Mishima (JP); Yoshio Itou, Susono (JP); Hiroyuki Amano, Susono (JP); Tatsuya Imamura, Okazaki (JP); Akiko Nishimine, Susono (JP); Hiroaki Ebuchi, Hadano (JP); Hiroaki Kodera, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,550

(22) Filed: Apr. 29, 2024

(65) Prior Publication Data

US 2024/0278655 A1 Aug. 22, 2024

Related U.S. Application Data

(63) Continuation of application No. 17/352,774, filed on Jun. 21, 2021, now Pat. No. 11,999,243.

(30) Foreign Application Priority Data

Aug. 7, 2020 (JP) .................................. 2020-135163

(51) Int. Cl.
*B60L 15/20* (2006.01)
*B60K 23/02* (2006.01)
(Continued)

(52) U.S. Cl.
CPC .......... *B60L 15/2054* (2013.01); *B60K 23/02* (2013.01); *B60K 35/22* (2024.01);
(Continued)

(58) Field of Classification Search
CPC ........... B60L 15/2054; B60L 2240/423; B60L 2240/443; B60L 2240/486;
(Continued)

(56) References Cited

U.S. PATENT DOCUMENTS 5,635,903 A * 6/1997 Koike .................... B60Q 5/008
340/384.1
9,616,878 B2 4/2017 Tanaka et al.
(Continued)

FOREIGN PATENT DOCUMENTS

CN 107054155 A 8/2017
CN 206884797 U 1/2018
(Continued)

OTHER PUBLICATIONS

JP2011215437A, Sound Control Device, Vehicle, Game System, Program, and Information Storage Medium, Nakanishi, Filed: Mar. 31, 2010 Pub: Oct. 27, 2011, English Translation (Year: 2011).*
(Continued)

*Primary Examiner* — Jason Holloway
*Assistant Examiner* — Benjamin J Brosh
(74) *Attorney, Agent, or Firm* — Oliff PLC

(57) ABSTRACT

An electric vehicle includes a shift lever and a clutch pedal for simulating manual gear changes of a traditional vehicle equipped with an internal combustion engine and manual transmission, and includes a controller for controlling the operation of the electric vehicle. The driver operates the shift lever in a similar fashion to that of a traditional manual transmission shift lever, however the associated gear positions do not correspond to physical gears in a transmission
(Continued)

but rather virtual gear stage modes that correspond to mapped torque characteristics with respect to the rotational speed of the electric motor. The clutch pedal is operated by the driver when the shift lever is operated. The controller calculates the virtual engine speed of the virtual engine based on the virtual gear stage mode selected by the shift lever and the operation amount of the clutch pedal, and displays the virtual engine speed on a display.

1 Claim, 12 Drawing Sheets

(51) Int. Cl.
  *B60K 35/22* (2024.01)
  *B60K 35/26* (2024.01)
  *B60K 35/28* (2024.01)
  *B60K 35/60* (2024.01)
  *B60K 35/81* (2024.01)
  *B60K 37/20* (2024.01)
  *B60Q 5/00* (2006.01)
  *G10K 15/02* (2006.01)
  *B60K 1/00* (2006.01)

(52) U.S. Cl.
  CPC .............. *B60K 35/26* (2024.01); *B60K 35/28* (2024.01); *B60K 35/60* (2024.01); *B60K 35/81* (2024.01); *B60K 37/20* (2024.01); *B60Q 5/00* (2013.01); *G10K 15/02* (2013.01); *B60K 1/00* (2013.01); *B60L 2240/423* (2013.01); *B60L 2240/443* (2013.01); *B60L 2240/486* (2013.01); *F16H 2306/30* (2013.01)

(58) Field of Classification Search
  CPC ........... B60L 2240/441; B60L 2250/24; B60L 15/20; B60L 50/60; B60L 15/28; B60L 2260/20; B60L 2260/44; B60K 23/02; B60K 1/00; B60K 35/22; B60K 35/26; B60K 2360/172; B60K 2360/177; B60K 35/213; B60K 35/28; B60K 35/60; B60K 35/81; B60K 37/20; B60K 20/00; B60K 2001/001; F16H 2306/30; Y02T 10/64; Y02T 10/70; Y02T 10/72; B60Q 5/00; G10K 15/02
  See application file for complete search history.

(56) References Cited

U.S. PATENT DOCUMENTS

| | | |
|---|---|---|
| 11,654,777 B2 | 5/2023 | Nishimine et al. |
| 11,794,718 B2 | 10/2023 | Isami et al. |
| 11,833,908 B2 | 12/2023 | Isami et al. |
| 11,897,338 B2 | 2/2024 | Isami et al. |
| 11,926,222 B2 | 3/2024 | Isami et al. |
| 11,932,118 B2 | 3/2024 | Nishimine et al. |
| 11,999,243 B2 | 6/2024 | Isami et al. |
| 12,351,038 B2 | 7/2025 | Isami et al. |
| 2004/0170288 A1* | 9/2004 | Maeda ................ H04R 5/04 381/86 |
| 2008/0060861 A1 | 3/2008 | Baur et al. |
| 2009/0080672 A1* | 3/2009 | Smith ................ H04R 27/00 381/86 |
| 2013/0035817 A1 | 2/2013 | Bahar et al. |
| 2014/0328494 A1* | 11/2014 | Pommerer ............ H04R 1/021 381/86 |
| 2015/0197195 A1* | 7/2015 | Hera .................... H03G 5/16 381/86 |
| 2015/0199955 A1* | 7/2015 | Draganic .............. G08B 6/00 381/86 |
| 2017/0284543 A1 | 10/2017 | Nishikawa et al. |
| 2018/0090125 A1* | 3/2018 | Yeung .................. B60Q 9/00 |
| 2018/0281619 A1 | 10/2018 | Suzuki et al. |
| 2022/0063494 A1* | 3/2022 | Duo' .................... H04R 1/02 |

FOREIGN PATENT DOCUMENTS

| | | | |
|---|---|---|---|
| CN | 207458386 U | 6/2018 | |
| CN | 109050348 A | 12/2018 | |
| CN | 109050350 A | 12/2018 | |
| CN | 109139896 A | 1/2019 | |
| CN | 109177742 A | 1/2019 | |
| CN | 109291804 A | 2/2019 | |
| CN | 109606132 A | 4/2019 | |
| CN | 209409831 U | 9/2019 | |
| CN | 110422054 A | 11/2019 | |
| CN | 110696630 A | 1/2020 | |
| CN | 113459969 A | 10/2021 | |
| DE | 202017100524 U1 * | 3/2017 | ............ G10K 15/02 |
| EP | 3 401 201 A1 | 11/2018 | |
| JP | 2009-077585 A | 4/2009 | |
| JP | 2010-252526 A | 11/2010 | |
| JP | 2011011721 A | 1/2011 | |
| JP | 2011-215436 A | 10/2011 | |
| JP | 2011215437 A * | 10/2011 | |
| JP | 2014240239 A * | 12/2014 | |
| JP | 2018-166386 A | 10/2018 | |
| JP | 2018-191366 A | 11/2018 | |
| WO | WO-2011132347 A1 * | 10/2011 | ............ B60Q 5/008 |
| WO | 2019/187518 A1 | 10/2019 | |
| WO | 2020/025860 A1 | 2/2020 | |
| WO | 2020/095280 A1 | 5/2020 | |

OTHER PUBLICATIONS

JP2014240239A, Artificial Engine Sound Control Device, Artificial Engine Sound Control system Using the Same, Movable Body Device, and Control Method of Artificial Engine Sound, Hara et al., Filed: Jun. 12, 2013 Pub: Dec. 25, 2014, English Translation (Year: 2014).*
DE 202017100524 U1, System for Generating Engine Noise, Control Unit, and Program Code Means, Noack et al., Filed: Jan. 31, 2017 Pub: Mar. 15, 2017, English Translation (Year: 2017).*
Sep. 20, 2023 Office Action issued in U.S. Appl. No. 17/352,774.
Jan. 29, 2024 Notice of Allowance issued in U.S. Appl. No. 17/352,774.
Feb. 21, 2025 Notice of Allowance issued in U.S. Appl. No. 18/648,547.
Jul. 20, 2022 Office Action issued in U.S. Appl. No. 17/113,608.
Nov. 16, 2022 Notice of Allowance issued in U.S. Appl. No. 17/113,608.
Oct. 23, 2025 Office Action issued in U.S. Appl. No. 18/650,337.

* cited by examiner

ELECTRIC VEHICLE HAVING SYNTHESIZED INTERNAL COMBUSTION ENGINE SOUND

CROSS-REFERENCE TO RELATED APPLICATIONS

This is a continuation of U.S. patent application Ser. No. 17/352,774 filed Jun. 21, 2021 (now U.S. Pat. No. 11,999,243), which claims priority under 35 U.S.C. § 119 to Japanese Patent Application No. 2020-135163, filed Aug. 7, 2020. The contents of each of the above-identified applications are incorporated herein by reference in their entirety.

BACKGROUND

Field

The present disclosure relates to an electric vehicle having an electric motor for transmitting torque to wheels.

Background Art

JP 2018-166386 discloses a technique for producing a pseudo shift change in a vehicle driven by a drive motor. In this vehicle, torque variation control is performed to decrease torque of the drive motor by a set variation amount and then increase it in response to a predetermined trigger defined by a vehicle speed, accelerator opening degree, accelerator opening speed, or brake depression amount. As a result, feeling of strangeness given to a driver who is accustomed to a driving a vehicle including a multi-stage transmission is suppressed.

In a manual transmission vehicle (hereinafter referred to as "MT vehicle") equipped with a shift device (shift lever) and a clutch device (clutch pedal) for shifting gears, a driver changes gears by operating a shift lever when stepping on the clutch device. Such manual gear change operation causes instantaneous fluctuations in the torque transmitted to wheels when the clutch device is released and connected. According to the above technique, the torque variation of the manual gear change operation is pseudo reproduced by the torque variation control of the drive motor.

SUMMARY

However, in the above technique, the driver cannot determine the timing of the torque variation control simulating the manual gear change operation voluntarily by the driver's own operation. This is because the vehicle of the above technique does not have a clutch device, nor a shift device, as provided in MT vehicles. Thus, attempts to directly apply the aforementioned method of simulating gear changes into vehicles equipped with manual transmissions may lead to unsatisfying driving feel for those seeking the pleasure of operating such vehicles.

Therefore, we consider to provide an electric vehicle that can simulate the manual gear change operation of a manual transmission vehicle. In electric vehicles, unlike MT vehicles, engine noise and engine vibration do not occur, so it is difficult for drivers to grasp the condition of the vehicle. Therefore, when the driver performs a pseudo manual gear change operation in an electric vehicle, it is hard to perform a smooth manual gear change operation, which may cause discomfort to the driving feeling.

The present disclosure has been made in view of the above-described problems, and an object thereof is to enhance convenience by providing useful information to the driver in performing a manual gear change operation in an electric vehicle that pseudo-realizes a manual gear change operation of a manual transmission vehicle.

In order to achieve the above purpose, the first disclosure applies to an electric vehicle that includes an electric motor for transmitting torque to a wheel, and does not include an actual engine, a transmission connected to the actual engine, and a clutch mechanism connected to the actual engine. The electric vehicle includes a pseudo-shifter for selecting an arbitrary virtual gear stage mode among a plurality of virtual gear stage modes in which torque characteristics of the electric motor differ in stages with respect to a rotational speed of the electric motor, a pseudo-clutch operated by the driver when the pseudo-shifter is operated and configured to simulate an operation of the clutch mechanism, and a controller configured to control the electric vehicle. The controller is configured to execute a calculation process of calculating a virtual engine speed, which is a rotation speed of the virtual engine when a torque transmitted from the electric motor to the wheel is assumed to be the torque transmitted from the virtual engine to the wheel via the virtual clutch mechanism and the virtual transmission, based on the virtual gear stage mode selected by the pseudo-shifter and an operation amount of the pseudo-clutch, and a display process of displaying the virtual engine speed on a display.

The second disclosure has the following further features in the first disclosure.

In the calculation process, the controller is configured to calculate an expected engine speed, which is the virtual engine speed of the virtual gear stage mode one gear stage higher or one gear stage lower than the currently selected virtual gear stage mode which is expected to be selected next to the virtual gear stage mode currently selected. In the display process, the controller is configured to display the expected engine speed with the virtual engine speed.

The third disclosure further has the following features in the second disclosure.

During acceleration of the electric vehicle, in the calculation process, the controller is configured to calculate the virtual engine speed when the virtual gear stage mode is shifted up to the next higher virtual gear stage mode as the expected engine speed.

The fourth disclosure further has the following features in the second disclosure.

During deceleration of the electric vehicle, in the calculation process, the controller is configured to calculate the virtual engine speed when the virtual gear stage mode is shifted down to the next lower virtual gear stage mode as the expected engine speed.

The fifth disclosure further has the following features in the second disclosure.

In the calculation process, in response to the change of the virtual gear stage mode selected by the pseudo-shifter, the controller is configured to calculate the virtual engine speed corresponding to the virtual gear stage mode after the change as the expected engine speed.

The sixth disclosure has the following features in the second disclosure.

In the display process, the controller is configured to display the expected engine speed during the period when the amount of the pseudo-clutch operation is greater than a predetermined amount.

According to the first disclosure, the calculated virtual engine speed is displayed on the display in the electric vehicle without the actual engine and the transmission and the clutch mechanism connected to the actual engine. Thus, since the driver can perform the manual gear change operation while referring to the displayed virtual engine speed, it is possible to increase the convenience of the driver.

According to the second disclosure, the expected engine speed after the change of the virtual gear stage mode is displayed on the display. This allows the driver to perform a smooth manual gear change operation while referring to the indicated expected engine speed.

In particular, according to the third disclosure, during acceleration of the electric vehicle, the expected engine speed when shifted up is displayed on the display. Thus, the driver can smoothly perform the shift-up operation during acceleration.

Further, according to the fourth disclosure, during deceleration of the electric vehicle, the expected engine speed when shifted down is calculated and displayed on the display. Thus, the driver can smoothly perform the shift-down operation during deceleration.

According to the fifth disclosure, when the shift lever is operated by the driver, the expected engine speed corresponding to the virtual gear stage mode after operation is calculated and displayed on the display. This allows the driver to perform the engagement operation of the clutch pedal while referring to the indicated expected engine speed.

According to the sixth disclosure, the expected engine speed is displayed when the operation amount of the clutch pedal determined from the clutch operation signal is larger than the prescribed operation amount. This allows the expected engine speed to be displayed in situations where the driver needs the display.

DETAILED DESCRIPTION

Hereinafter, an embodiment of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures, steps or the like theoretically.

1. First Embodiment 1-1. Configuration of Electric Vehicle of First Embodiment

Figure 1:
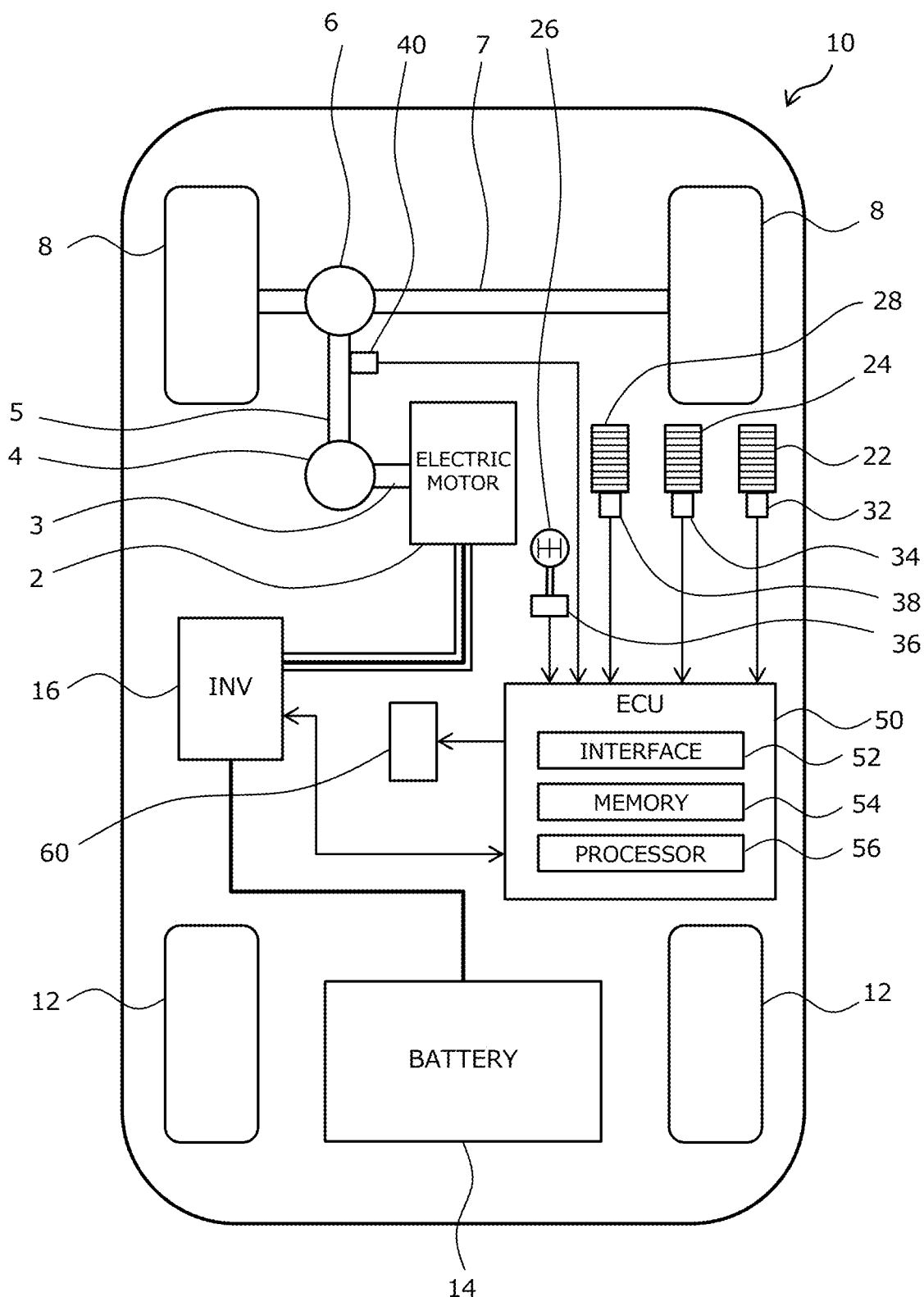
FIG. 1 is a diagram schematically showing a configuration of an electric vehicle according to a present embodiment.

FIG. 1 is a diagram schematically showing a configuration of an electric vehicle according to the present embodiment. As shown in FIG. 1, an electric vehicle 10 is provided with an electric motor 2 as a driving source. The electric motor 2 is, for example, a three-phase AC motor. An output shaft 3 of the electric motor 2 is connected to one end of a propeller shaft 5 via a gear mechanism 4. The other end of the propeller shaft 5 is connected to a drive shaft 7 in front of the vehicle via a differential gear 6. The electric vehicle 10 is provided with drive wheels 8 as front wheels and driven wheels 12 as rear wheels. The drive wheels 8 are provided on each end of the drive shaft 7. A rotation speed sensor 40 for detecting a shaft rotation speed Np is disposed on the propeller shaft 5.

The electric vehicle 10 includes a battery 14 and an inverter (INV) 16. The battery 14 stores electrical energy for use in driving the electric motor 2. The inverter (INV) 16 converts a direct current stored in the battery 14 to a three-phase alternating current, for example, by performing a pulse width modulation process (PWM). Further, the inverter (INV) 16 has a function of controlling driving torque of the electric motor 2 based on a target driving torque input from an ECU 50 to be described later.

The electric vehicle 10 includes an accelerator pedal 22 for inputting an acceleration request and a brake pedal 24 for inputting a braking request as an operation request input device for inputting an operation request to the electric vehicle 10 by a driver. The accelerator pedal 22 is provided with an accelerator position sensor 32 for detecting an accelerator opening Pap (%). Further, the brake pedal 24 is provided with a brake position sensor 34 for detecting the pedal depression amount. Each of signals detected by the accelerator position sensor 32 and the brake position sensor 34 is output to the ECU 50 to be described later.

The electric vehicle 10 further includes a shift lever 26 and a clutch pedal 28 as the operation request input device. However, the electric vehicle 10 of the present embodiment is a vehicle driven by the electric motor 2 is not provided with an actual engine. Therefore the electric vehicle 10 does not include a transmission and a clutch mechanism connected to the actual engine of the MT vehicle. Therefore, the shift lever 26 and the clutch pedal 28 are given the following functions as a pseudo-shift lever and a pseudo-clutch pedal in place of the actual functions of mechanically operating the actual transmission and the clutch mechanism.

The shift lever 26 is provided with a function as a pseudo-shifter (shift device) for the driver to select one arbitrary virtual gear stage mode from among a plurality of virtual gear stage modes in which torque characteristics of the electric motor 2 are defined in stages with respect to a rotational speed of the electric motor 2. The plurality of virtual gear stage modes are shift modes simulating the gear stages of an MT vehicle, including, for example, 1st gear, 2nd gear, 3rd gear, 4th gear, 5th gear, 6th gear and N (neutral) modes. The torque characteristics of each virtual gear stage mode are preset to the torque characteristics simulating the gear stage of the MT vehicle. However, since each of these virtual gear stage modes simply simulate the gear stage of an MT vehicle, there is no restriction of the torque characteristics of each virtual gear stage mode to correspond to an actual fixed gear ratio. That is, the torque characteristics of each of the plurality of virtual gear stage modes can be freely preset within an output range of the electric motor 2.

The shift lever 26 has a structure simulating a shift lever provided by an MT vehicle. The layout and feeling of operation of the shift lever 26 is equivalent to an actual MT vehicle. The shift lever 26 is provided with each position corresponding to the plurality of virtual gear stage modes having different torque characteristics. The shift lever 26 is provided with a shift position sensor 36 for detecting a shift position Gp representing a position of the virtual gear stage mode. Shift operation signals detected by the shift position sensor 36 are output to the ECU 50 which will be described later.

The clutch pedal 28 is provided with a function as a pseudo-clutch (clutch device) having a structure simulating a clutch pedal provided by the MT vehicle. The clutch pedal 28 is depressed when the driver operates the shift lever 26. The layout and feeling of operation of the clutch pedal 28 is equivalent to an actual MT vehicle. The clutch pedal 28 is provided with a clutch position sensor 38 for detecting a clutch pedal depressing amount Pc (%) which is an operation amount of the clutch pedal 28. The clutch operation signal detected by the clutch position sensor 38 is output to the ECU 50 which will be described later. The clutch operation signal detected by the clutch position sensor 38 is output to the ECU50 to be described later.

The electric vehicle 10 is provided with an instrument panel 60 in a driver's seat. The instrument panel 60 functions as the display for displaying various operating states of the electric vehicle 10. The instrument panel 60 includes, for example, a plurality of meters. Alternatively, the instrument panel 60 is a liquid crystal display in which a plurality of meters are displayed.

The electric motor 2 of the electric vehicle 10 is controlled by a controller 50. The controller 50 is the ECU (Electronic Control Unit). A processing circuitry of the ECU 50 includes at least an input/output interfaces 52, at least one memory 54, and at least one CPU (processor) 56. The input/output interface 52 is provided to receive sensor signals from various sensors mounted on the electric vehicle 10 and to output operation signals to various actuators provided in the electric vehicle 10. The various sensors for which the ECU 50 receives signals include the sensors as described above, as well as various sensors required for the control of the electric vehicle 10. The actuators in which the ECU 50 output the operation signals include the various actuators such as the electric motor 2 described above. The memory 54 stores various control programs for controlling the electric vehicle 10, the latest shift position Gp, a map, and the like. The CPU (processor) 56 reads out and executes the control program or the like from the memory 54, and generates operation signals based on the received sensor signals.

The functions of the ECU 50 are realized by software, firmware, or a combination of software and firmware. Also, if the processing circuitry of the ECU 50 includes at least one dedicated hardware, the processing circuitry may be, for example, a single circuit, a complex circuit, a programmed processor, a parallel programmed processor, ASIC, FPGA, or combinations thereof. The functions of each part of the ECU 50 may be realized in the respective processing circuitry. Further, the functions of each part of the ECU 50 may be realized by the processed circuitry together. In addition, for each function of the ECU 50, some of the functions of the ECU 50 may be realized with dedicated hardware, and others may be realized with software or firmware. As described above, the processing circuitry realizes each functions of the ECU 50 by using hardware, software, firmware, or combinations of these functions.

1-2. Functions of ECU

The control of the electric vehicle 10 performed by the ECU 50 includes torque control for controlling torque transmitted to the drive wheels 8. In the torque control, the driving torque of the electric motor 2 is controlled so that an electric motor driving torque Tp transmitted to the propeller shaft 5 becomes a required electric motor driving torque Tpreq. That is, the ECU 50 functions as a torque controller provided by the electric vehicle 10.

Here, in the torque control of the electric motor 2, the ECU 50 performs a calculation assuming that a traveling condition of the electric vehicle 10 is realized by a virtual engine, and a virtual MT vehicle mounted with a virtual transmission and a virtual clutch mechanism. In the following description, an engine, a clutch mechanism, and a transmission that are virtually mounted on the electric vehicle 10 will be referred to as a "virtual engine," "virtual clutch mechanism," and "virtual transmission," respectively. Then, the ECU 50 calculates a transmission output torque Tgout output from the virtual transmission, and uses the calculated transmission output torque Tgout as the required electric motor driving torque Tpreq. In the following description, the engine output torque of the virtual engine is referred to as the "virtual engine output torque Teout", and the rotational speed of the virtual engine is referred to as the "virtual engine speed Ne". In the following description, an engine output torque of the virtual engine is denoted as a "virtual engine output torque Teout", and an engine speed of the virtual engine is denoted as a "virtual engine speed Ne".

Figure 2:
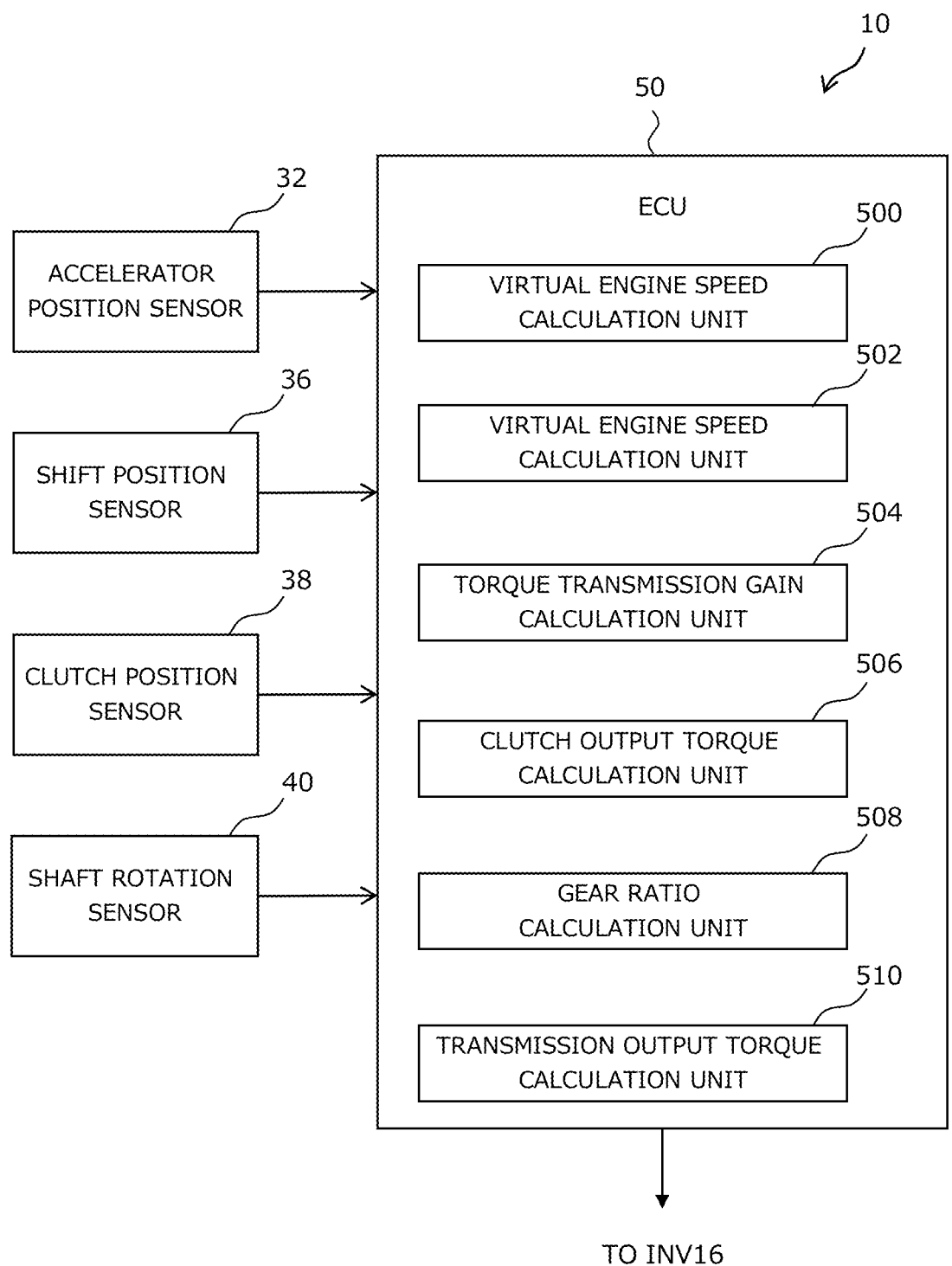
FIG. 2 is a diagram illustrating a functional block of an ECU relating to torque control of the electric motor.

FIG. 2 is a diagram illustrating a functional block of the ECU 50 relating to torque control of the electric motor. The ECU 50 includes a virtual engine speed calculation unit 500, a virtual engine output torque calculation unit 502, a torque transmission gain calculation unit 504, a clutch output torque calculation unit 506, a gear ratio calculation unit 508, and a transmission output torque calculation unit 510 as functional blocks related to the torque control of the electric motor 2. Each functional block will be described in detail below.

1-2-1. Virtual Engine Speed Calculation Unit 500

The virtual engine speed Ne is the rotational speed of the virtual engine when it is assumed that the torque transmitted from the electric motor 2 to the driving wheels 8 is the torque transmitted from the virtual engine through the virtual clutch mechanism and the virtual transmission. While the electric vehicle 10 is traveling, the ECU 50 dynamically calculates the virtual engine speed Ne based on a driving condition. For example, the ECU 50 performs inverse calculation of the virtual engine speed Ne during traveling from the following equation (1) using a shaft rotational speed "Np" of the propeller shaft 5, a gear ratio "r" corresponding to the shift position Gp, and a slip ratio "slip" of the virtual clutch mechanism calculated from the clutch pedal depression amount Pc or the like.

$$Ne = Np \times (1/r) \times \text{slip} \qquad (1)$$

It can be assumed that kinetic energy that is not used for torque transmission to the propeller shaft 5 out of the energy output from an engine is used to increase the virtual engine speed Ne. Therefore, the calculation of the virtual engine speed Ne may be a method of dynamically calculating based on the equation of motion based on the kinetic energy.

Further, during idling of the MT vehicle, idle speed control (ISC control) is performed to maintain the engine speed at a constant engine speed. Therefore, in view of the ISC control in the virtual engine, when, for example, the shaft rotation speed Np is 0 (zero) and the accelerator opening Pap is 0%, the ECU 50 outputs the virtual engine speed Ne as a predetermined idling speed (for example, 1000 rpm) on the assumption that the virtual engine is idling. The calculated virtual engine speed Ne is output to the virtual engine output torque calculation unit 502.

1-2-2. Virtual Engine Output Torque Calculation Unit 502

Figure 3:
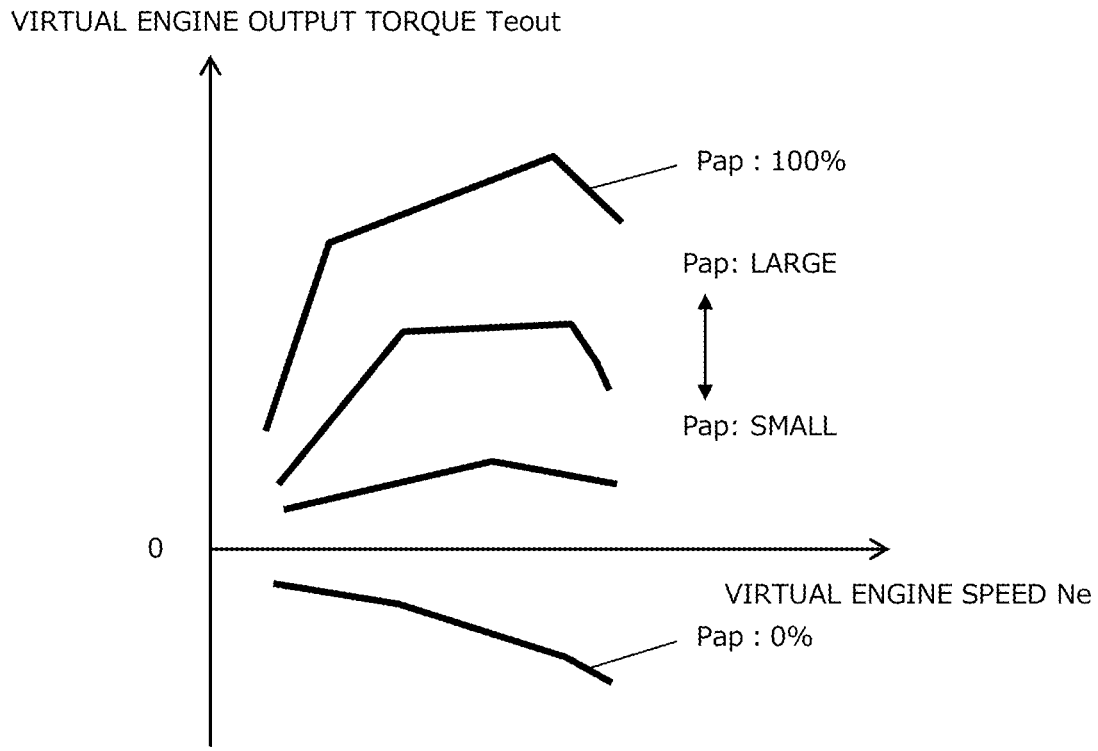
FIG. 3 is a diagram showing a calculation map of a virtual engine output torque.

The virtual engine output torque calculation unit 502 is a functional block that executes a process of calculating the virtual engine output torque Teout. The accelerator opening degree Pap and the virtual engine speed Ne are input to the virtual engine output torque calculation unit 502. The memory 54 of the ECU 50 stores a map in which the virtual engine output torque Teout for the virtual engine speed Ne is specified for each accelerator opening Pap. FIG. 3 is a diagram showing a calculation map of the virtual engine output torque. In the virtual engine output torque calculation unit 502, the virtual engine output torque Teout corresponding to the input accelerator opening Pap and the virtual engine speed Ne is calculated using the map shown in FIG. 3 The calculated virtual engine output torque Teout is output to the clutch output torque calculation unit 506.

1-2-3. Torque Transmission Gain Calculation Unit 504

Figure 4:
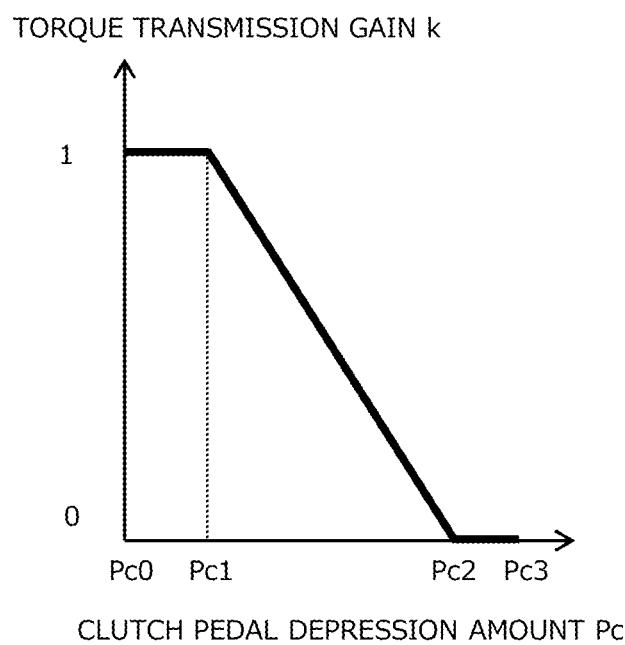
FIG. 4 is a diagram showing a calculation map of a torque transmission gain.

The torque transmission gain calculation unit 504 is a functional block that executes a process of calculating a torque transmission gain k. The torque transmission gain k is a gain for calculating a torque transmission degree Corresponding to the virtual clutch mechanism depression amount of the virtual engine. The clutch pedal depressing amount Pc is input to the torque transmission gain calculation unit 504. The memory 54 of the ECU 50 stores a map in which the torque transmission gain k for the clutch pedal depression amount Pc is specified. FIG. 4 is a diagram showing a calculation map of the torque transmission gain. As shown in FIG. 4, the torque transmission gain k is specified so that the clutch pedal depression amount Pc becomes 1 in the range from pc0 to pc1, and gradually decreases toward 0 as the clutch pedal depression amount Pc increases in the range from Pc1 to Pc2 and the clutch pedal depression amount Pc becomes 0 in the range from Pc2 to Pc3. Here, Pc0 corresponds to a position where the clutch pedal depression amount Pc is 0%, Pc1 corresponds to a position of a play limit when depressing from Pc0, Pc3 corresponds to a position where the clutch pedal depression amount Pc is 100%, and Pc2 corresponds to a position of a play limit when returning from Pc3. In the torque transmission gain calculating unit 504, the torque transmission gain k corresponding to the input clutch pedal depression amount Pc is calculated using the map shown in FIG. 4. The calculated torque transmission gain k is output to the clutch output torque calculation unit 506.

The change in the torque transmission gain k with respect to the clutch pedal depression amount Pc shown in FIG. 4 is not limited to the change curve as long as it is a monotonic decrease toward 0 in the broad sense (monotonically non-increasing). For example, a change in torque transmission gain k ranging from Pc1 to Pc2 is not limited to a linear monotonic decrease, but may be a monotonically decreasing curve that is convex upward, or may be a monotonically decreasing curve that is convex downward.

1-2-4. Clutch Output Torque Calculation Unit 506

The clutch output torque calculation unit 506 is a functional block that executes a process of calculating the clutch output torque Tcout. The clutch output torque Tcout is a torque output from the virtual clutch mechanism connected to the virtual engine. The virtual engine output torque Teout and the torque transmission gain k are input to the clutch output torque calculation unit 506. In the clutch output torque calculation unit 506, the clutch output torque Tcout is calculated using the following equation (2) in which the virtual engine output torque Teout is multiplied by the torque transmission gain k. The calculated clutch output torque Tcout is output to the transmission output torque calculation unit 510.

$$Tcout = Teout \times k \qquad (2)$$

The actual clutch mechanism often includes a damping device such as a spring or a damper. Therefore, the clutch output torque Tcout may calculate the dynamic transmission torque in consideration of the respective properties.

1-2-5. Gear Ratio Calculation Unit 508

Figure 5:
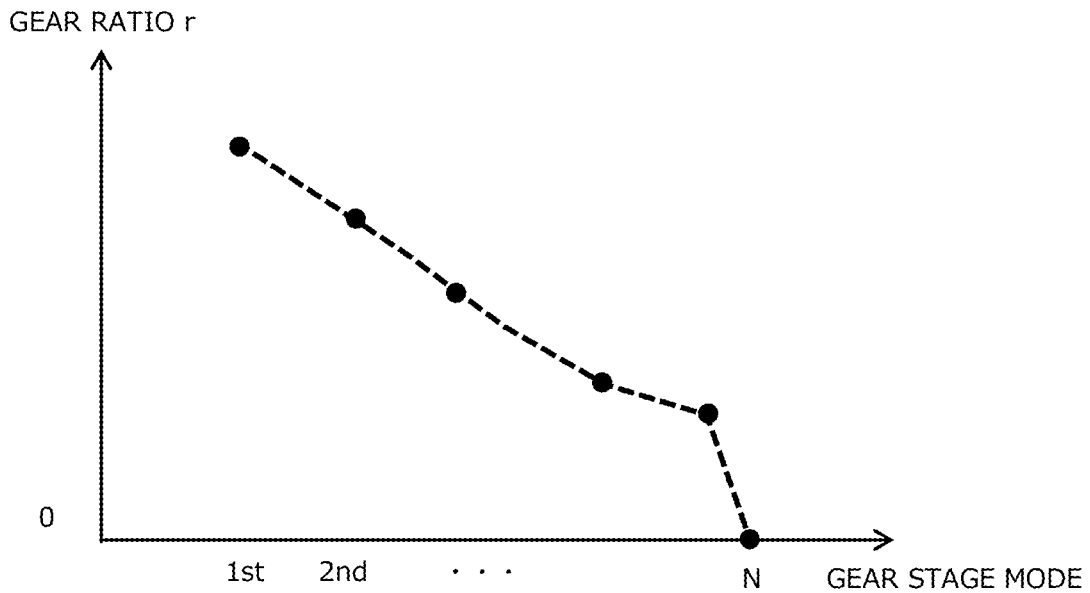
FIG. 5 is a diagram showing a calculation map of a gear ratio.

The gear ratio calculation unit 508 is a functional block that executes a process of calculating the gear ratio r. The gear ratio r is a torque characteristic of the electric motor 2 corresponding to a plurality of virtual gear stage modes, which simulates the gear ratio of the transmission. The shift position Gp is input to the gear ratio calculation unit 508. The memory 54 of the ECU 50 stores a map in which the gear ratio r with respect to the shift position Gp is specified. FIG. 5 is a diagram showing a calculation map of the gear ratio. As shown in FIG. 5, the gear ratio r is specified so that the higher the shift position Gp is, the lower the gear ratio r is. In the gear ratio calculation unit 508, the gear ratio corresponding to the input shift position Gp is calculated using the map shown in FIG. 5. The calculated gear ratio r is output to the transmission output torque calculation unit 510.

1-2-6. Transmission Output Torque Calculation Unit 510

The transmission output torque calculation unit 510 is a functional block that executes a process of calculating the transmission output torque Tgout. The transmission output torque Tgout is a torque output from the virtual transmission. The clutch output torque Tcout and the gear ratio r are input to the transmission output torque calculation unit 510. In the transmission output torque calculation unit 510, the transmission output torque Tgout is calculated using the following equation (3) in which the clutch output torque Tcout is multiplied by the gear ratio r.

$$Tgout = Tcout \times r \qquad (3)$$

1-2-7. Torque Control of Electric Motor

In the torque control, the ECU 50 sequentially executes processing in the virtual engine output torque calculation unit 502, the torque transmission gain calculation unit 504, the clutch output torque calculation unit 506, the gear ratio calculation unit 508, and the transmission output torque calculation unit 510. The calculated transmission output torque Tgout is output to the inverter 16 as the required electric motor driving torque Tpreq. The inverter 16 controls the command value to the electric motor 2 so that the electric motor driving torque Tp approaches the required electric motor driving torque Tpreq. In the torque control, by such a process is repeatedly executed at a predetermined control cycle, the electric motor driving torque Tp is controlled to the required electric motor driving torque Tpreq.

1-3. Specific Operation Flow of Manual Gear Change Operation

Figure 6:
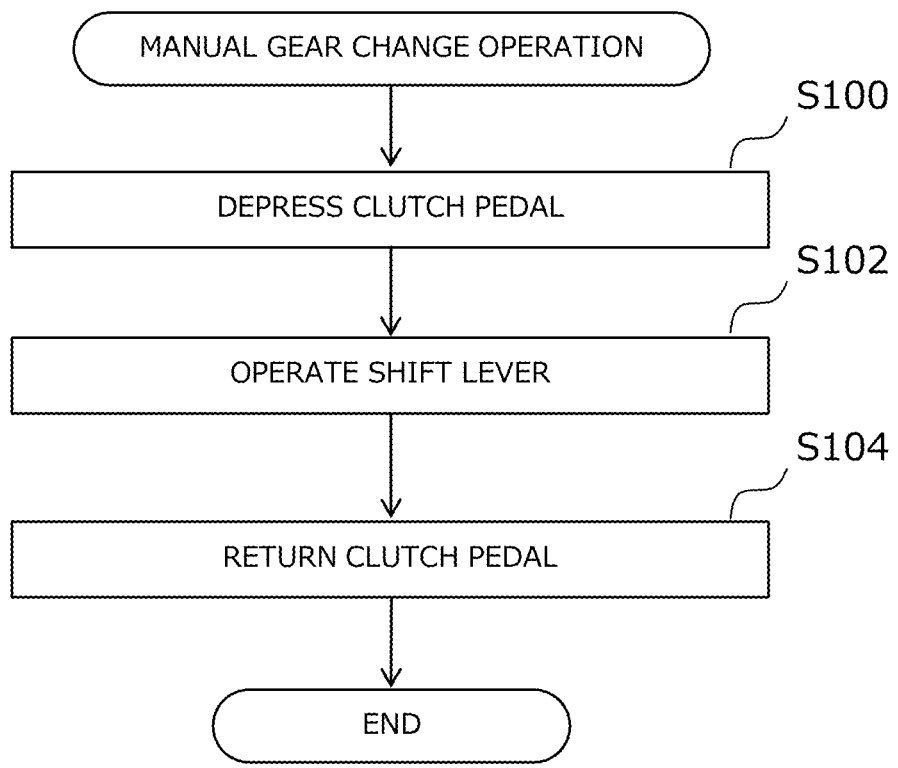
FIG. 6 is an operation flow chart showing a procedure of a pseudo manual gear change operation performed by a driver.

The driver of the electric vehicle 10 performs a manual gear change operation at any timing during operation. FIG. 6 is an operation flow chart showing a procedure of a pseudo manual gear change operation performed by the driver. As shown in FIG. 6, when the driver performs a pseudo manual gear change operation in the electric vehicle 10 of the present embodiment, first, the driver depresses the clutch pedal 28 (step S100). When the clutch pedal depressing amount Pc exceeds Pc1, the clutch output torque Tcout changes toward 0 as the clutch pedal depressing amount Pc increases. When the clutch pedal depressing amount Pc exceeds Pc2, the clutch output torque Tcout becomes 0. According to the depressing operation of the clutch pedal 28, the electric motor driving torque Tp changes toward 0 in response to the depressing operation of the clutch pedal 28. As a result, the driver can actually feel the sensation of the torque being released when the clutch pedal of the MT vehicle is depressed.

Next, the driver operates the shift lever 26 with the clutch pedal 28 depressed (step S102). Here, for example, the virtual gear stage mode of the shift lever 26 is operated from 1st gear to 2nd gear. According to the operation of the shift lever 26 with the depression of the clutch pedal 28, the driver can obtain a feeling similar to the manual gear change operation of the MT vehicle.

Next, the driver returns the clutch pedal 28 (step S104). When the clutch pedal depressing amount Pc becomes less than Pc2, the clutch output torque Tcout changes toward the virtual engine output torque Teout as the clutch pedal depressing amount Pc decreases. Then, when the clutch pedal depressing amount Pc becomes less than Pc1, the clutch output torque Tcout becomes the virtual engine output torque Teout. According to the return operation of the clutch pedal 28, the electric motor driving torque Tp corresponding to the return operation of the clutch pedal 28 changes toward the electric motor driving torque Tp in which the current virtual gear stage mode is reflected. As a result, the driver can actually feel the sensation that the torque is connected when the clutch pedal of the MT vehicle is returned.

According to the electric vehicle 10 of the present embodiment, the torque changes in response to the operation of the clutch pedal 28. This allow the driver to simulate the unique behavior of the MT vehicle due to manual gear change operation.

1-4. Features of Electric Vehicle of First Embodiment

Next, features of the electric vehicle 10 of the present embodiment will be described. According to the electric vehicle 10 of the present embodiment, the driver can simulate the manual gear change operation. Since the electric vehicle 10 does not generate the vibration and noise characteristic of engines, it is difficult to grasp vehicle behavior from a sensory perspective. The electric vehicle 10 of the present embodiment is characterized by a control of displaying the virtual engine speed Ne on the instrument panel 60 as useful information for the driver to perform the manual gear change operation. In the following description, the control is referred to as "virtual engine speed display control".

Figure 7:
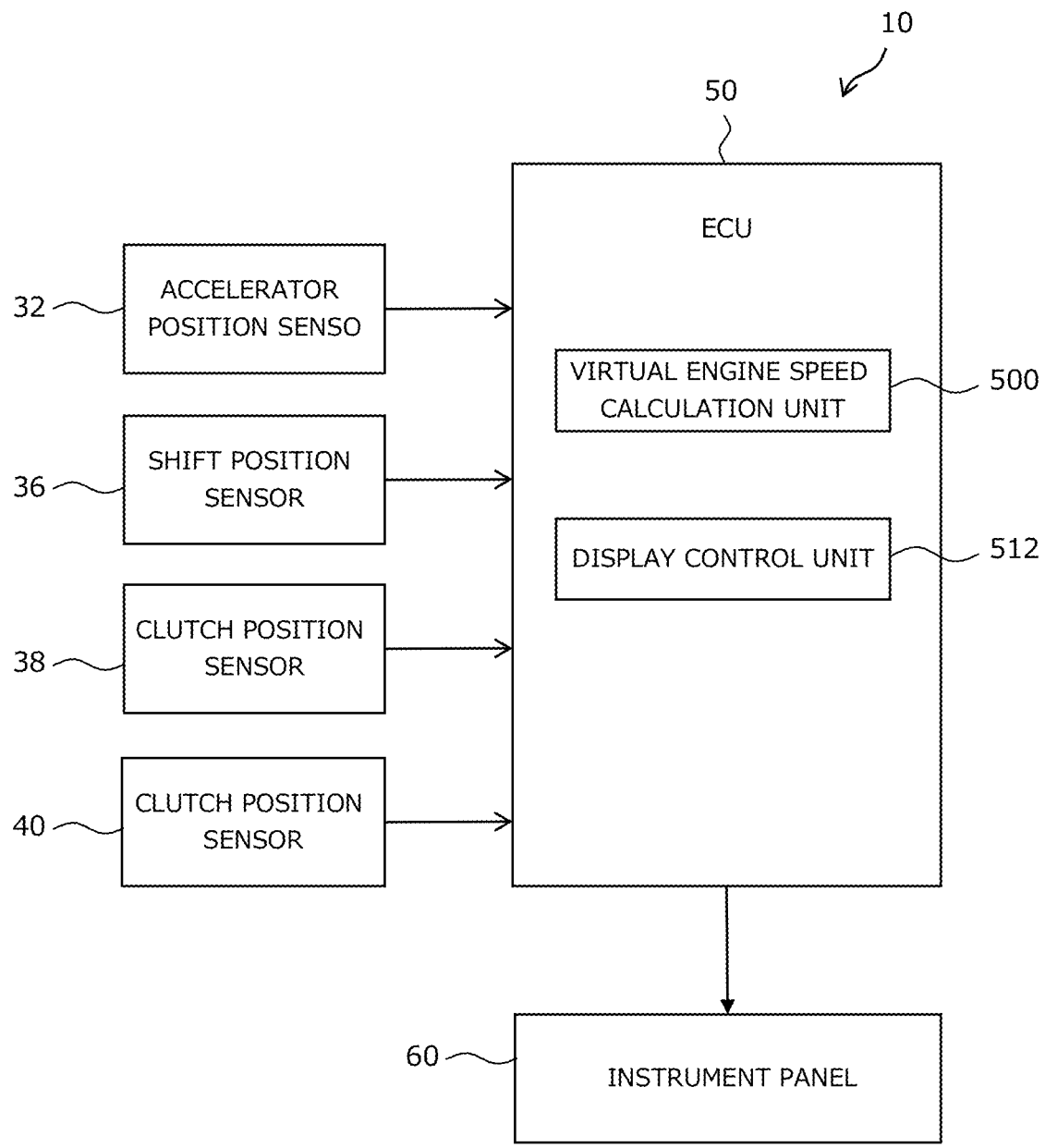
FIG. 7 is a functional block diagram extracting functions for executing a virtual engine speed display control.
Figure 8:
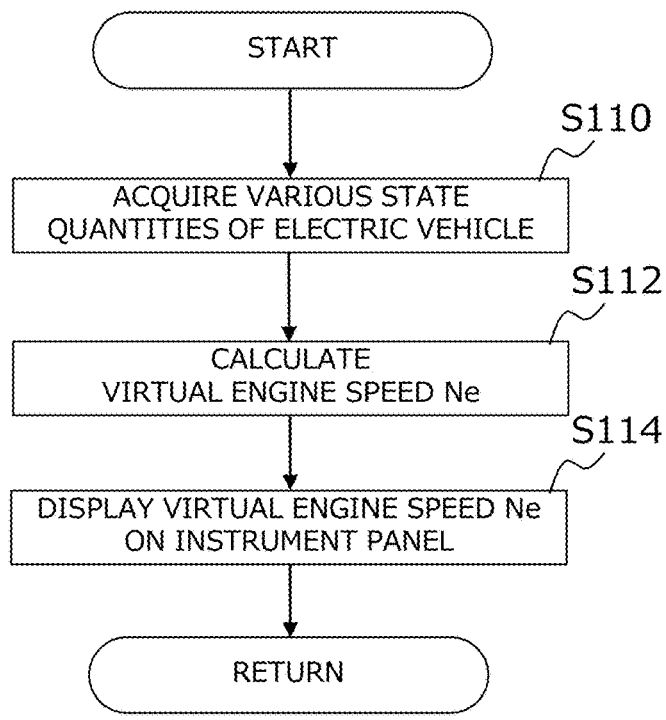
FIG. 8 is a flowchart showing a control routine for executing the virtual engine speed display control according to a first embodiment.

FIG. 7 is a functional block diagram extracting functions for executing the virtual engine speed display control. As shown in FIG. 7, the ECU 50 includes the above-described virtual engine speed calculation unit 500 and a display control unit 512 as functions for executing the virtual engine speed display control. FIG. 8 is a flowchart showing a control routine for executing the virtual engine speed display control. The control routine shown in FIG. 8 is repeatedly executed by the ECU 50 in a predetermined control cycle while the electric vehicle 10 is traveling. Hereinafter, the functions and operations of the virtual engine speed display control will be described in accordance with the flowchart shown in FIG. 8.

First, in the step S110, various state quantities of the electric vehicle 10 are acquired. The various state quantities are, for example, the shift position Gp output from various sensors, the clutch pedal depressing amount Pc, the accelerator opening Pap, the shaft rotation speed Np, and the like.

In the next step S112, the virtual engine speed Ne is calculated on the basis of the various state quantities acquired in step S110. Typically, the virtual engine speed calculation unit 500 of the ECU 50 inversely calculates the virtual engine speed Ne while traveling using the above equation (1).

Figure 9:
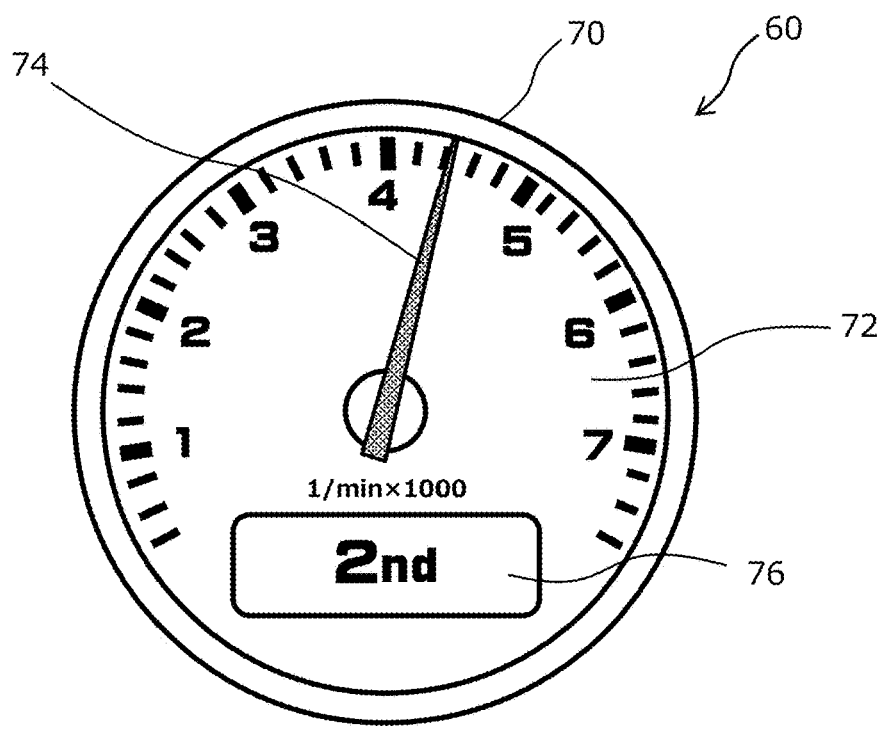
FIG. 9 is a diagram showing an example of a tachometer displayed on an instrument panel.
Figure 10:
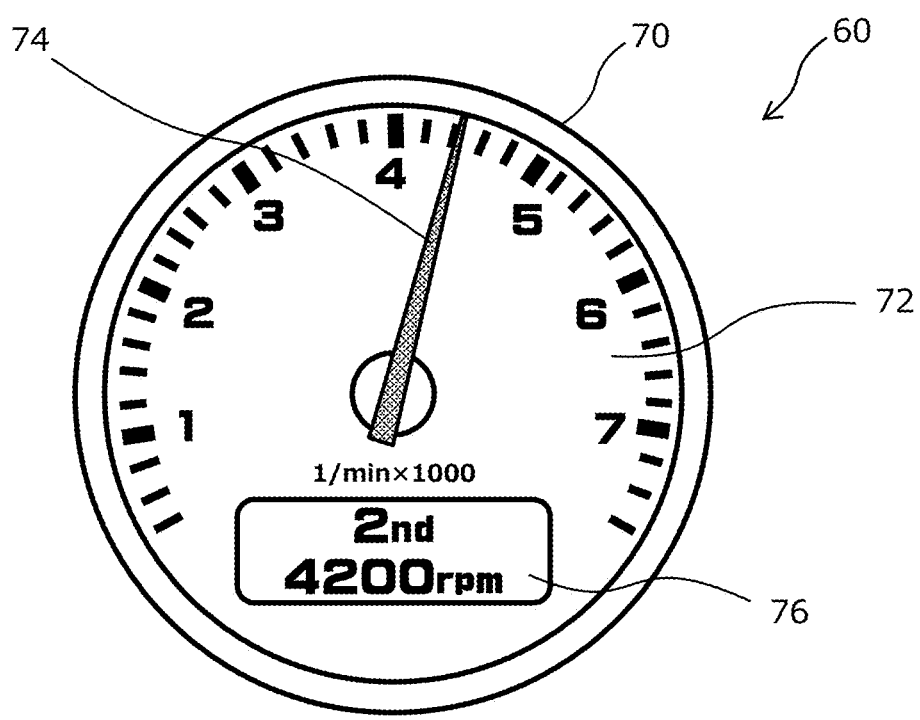
FIG. 10 is a diagram showing another example of the tachometer displayed on the instrument panel.

In the next step S114, the calculated virtual engine speed Ne is displayed on the instrument panel 60. FIG. 9 is a diagram showing an example of a tachometer displayed on the instrument panel. In the example shown in this figure, a tachometer 70 is provided on the instrument panel 60. The tachometer 70 includes a dial 72, a meter needle 74, and a display part 76. The display control unit 512 of the ECU 50 displays the virtual engine speed Ne on the tachometer 70. Typically, the meter needle 74 displays the calculated virtual engine speed Ne. The display part 76 is, for example, a segment type liquid crystal display. The display control unit 512 displays various types of information on the display part 76. In the example of shown in FIG. 9, the information displayed on the display part 76 is, for example, the current shift position. FIG. 10 is a diagram showing another example of the tachometer displayed on the instrument panel. In the example shown in FIG. 10, the display control unit 512 displays the current shift position and the virtual engine speed Ne on the display part 76.

According to the electric vehicle 10 configured as described above, the driver can determine various operation amounts in the manual gear change operation while referring to the virtual engine speed Ne displayed on the tachometer 70 of the instrument panel 60. Thus, it is possible to perform a smooth manual gear change operation with suppressing the fluctuation of the engine speed before and after the gear change, thereby increasing the convenience of the driver.

1-5. Modification of Electric Vehicle of First Embodiment

The electric vehicle 10 of the first embodiment may adopt modified examples as described below. Although several modified examples will be described below, these modified examples may be combined in the structure as appropriate. These modified examples are also applicable to an electric vehicle of another embodiment to be described later.

1-5-1. First Modified Example

The tachometer 70 is not limited to an analog display type tachometer with the meter needle 74, but may be configured as a digital display type tachometer. Further, when the instrument panel 60 is constituted by a liquid crystal display, the tachometer 70 may be configured as an image displayed on the liquid crystal display.

1-5-2. Second Modified Example

The electric vehicle 10 may be configured to be switchable between an MT travel mode that performs traveling with a pseudo manual gear change operation and an EV travel mode that performs general EV traveling without a pseudo manual gear change operation. In this case, the electric vehicle 10 may be provided with a configuration for switching the MT travel mode and the EV travel mode by a switch or the like.

Further, when the electric vehicle 10 is provided with an automated driving function for performing autonomous driving to a destination, in addition to the MT travel mode and the EV travel mode, an autonomous travel mode for further performing autonomous driving may be provided. According to such a configuration for switching the travel mode, it is possible to switch the travel mode according to the purpose of use, and therefore, for example, when the electric vehicle 10 is used by three persons, i.e., father, mother, and child, it is possible to cope with various usage modes, such as selecting the MT travel mode when the father is driving, selecting the EV travel mode when the mother is driving, and selecting the autonomous travel mode when the child is driving.

1-5-3. Third Modified Example

According to MT vehicles, the gear stage should generally not be changed unless the clutch pedal is depressed. According to an MT vehicle, the gear stage cannot be changed unless the clutch pedal is depressed. Therefore, in the electric vehicle 10 of the present embodiment, in order to approach the actual operation feeling of the MT vehicle, the selection operation of the virtual gear stage mode by the operation of the shift lever 26 may be configured to permit only when the driver depresses the clutch pedal 28. Such a configuration may be configured so that, the ECU 50 permits only the shift position Gp input when the clutch pedal depression amount Pc is larger than a prescribed depression amount Pcth1 to be written to the memory 54 as the latest shift position.

In MT vehicles, it is normal to be able to change gear to the neutral position without depressing the clutch pedal. Therefore, in the electric vehicle 10 of the present embodiment, similarly to the actual MT vehicle, the change of the mode to the neutral position may be configured to permit not limited to the depression of the clutch pedal 28. This make it possible to get even closer to the feel of the manual gear change operation of the MT vehicle.

1-5-4. Fourth Modified Example

An engine sound may be added to further enhance the feeling of driving an engine-mounted MT vehicle. Such a configuration, for example, the ECU 50 generates an engine sound corresponding to the virtual engine speed Ne, may be configured to output from a speaker. The engine sound may be configured to allow the driver to select a preferred engine sound, for example, from among several types depending on the engine type. In this case, the ECU 50 may generate an engine sound that simulates the sound of the selected engine type, based on the engine type selected by the driver (e.g., V8 type) and the virtual engine speed Ne. According to such a configuration, the driver can be used in a variety of ways, such as enjoying the V8 sound while driving the electric vehicle 10. Further, since the engine sound is generated according to the virtual engine speed Ne, it is possible to reproduce the engine sound of the situation such as revving or half-clutch in the MT vehicle.

1-5-5. Fifth Modified Example

The electric vehicle 10 of the present embodiment may be configured as a two-wheeled MT vehicle (i.e., motorcycle) not limited to four-wheeled MT vehicle (i.e., automobile). A typical motorcycle (MT vehicle) has a clutch lever operated by hand and a shift pedal operated by foot. Therefore, in the motorcycle as the electric vehicle 10, the shift pedal can be configured to have the function of the pseudo-shifter in place of the shift lever 26 of the automobile, and the clutch lever can be configured to have the function of the pseudo-clutch in place of the clutch pedal 28 of the automobile. This make it possible to simulate the manual gear change operation of the MT vehicle in an electric motorcycle.

2. Second Embodiment

2-1. Configuration of Electric Vehicle of Second Embodiment

The configuration of the electric vehicle of the second embodiment is the same as the electric vehicle 10 of the first embodiment shown in FIG. 1 Therefore, a detailed description of the electric vehicle 10 of the second embodiment is omitted.

2-2. Features of Electric Vehicle of Second Embodiment

The electric vehicle 10 of the second embodiment is characterized by a control that displays an expected virtual engine speed after changing gears ahead of time as information for the driver to refer to when performing the manual shifting operation. In the following description, an expected value of the virtual engine speed after changing gears is denoted as the "expected engine speed," and the control for displaying the expected engine speed is denoted as the "expected engine speed display control." The specific processing of the expected engine speed display control will be described below with reference to the flowchart.

Figure 11:
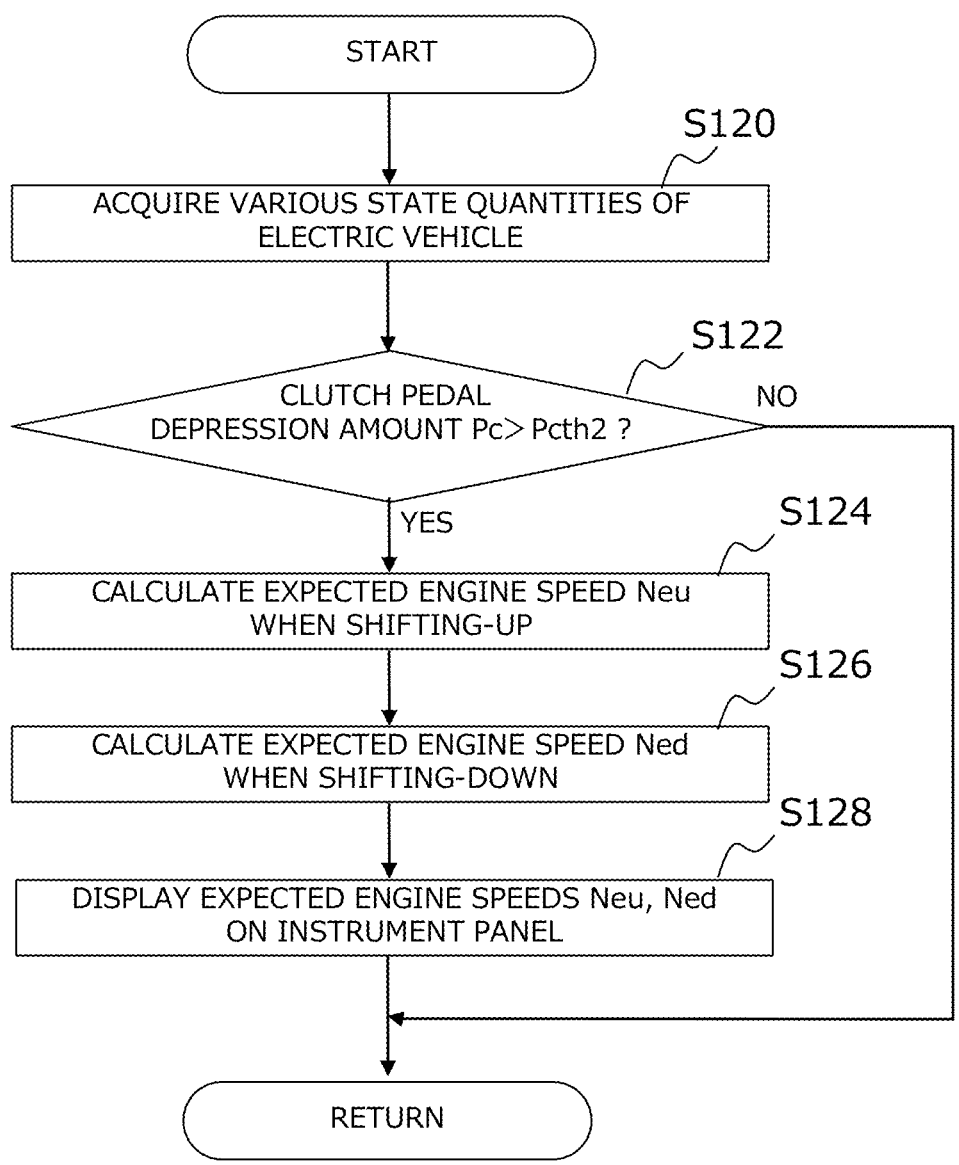
FIG. 11 is a flowchart showing a control routine for executing the expected engine speed display control according to a second embodiment.

FIG. 11 is a flowchart showing a control routine for executing the expected engine speed display control. The control routine shown in FIG. 11 is repeatedly executed by the ECU 50 in a predetermined control cycle while the electric vehicle 10 is traveling.

First, in the step S120, various status quantities of the electric vehicle 10 is acquired. Here, the ECU 50 executes the same process as that of the step S110. In the next step S122, it is determined whether the clutch pedal depression amount Pc is larger than a prescribed depression amount Pcth2. The predetermined depression amount Pcth2 is a threshold value for determining that the clutch pedal 28 is depressed in the manual gear change operation. When the determination is not satisfied in the process of the step S122, it can be determined that the manual gear change operation by the driver has not yet started or that the clutch pedal 28 depressed in the manual gear change operation has been returned. In this case, it is determined that the manual gear change operation is not performed immediately, and the processing of the routine is terminated.

On the other hand, when the determination is satisfied in the process of the step S122, it can be determined that the period is a period prior to the clutch pedal 28 being depressed and returned again in the manual gear change operation. In this case, the process proceeds to the next step S124.

In the step S124, the expected engine speed Neu is calculated when the virtual gear stage mode of the shift lever 26 is shifted up to the virtual gear stage mode on one stage higher in the present operating state. Here, the virtual engine speed calculation unit 500 calculates the virtual engine speed when the shift position Gp acquired in the step S120 is replaced with a value corresponding to the virtual gear stage mode on one stage higher, as the expected engine speed Neu.

Further, in the next step S126, the expected engine speed Ned is calculated when the virtual gear stage mode of the shift lever 26 is shifted down to the virtual gear stage mode on one stage lower in the present operating state. Here, the virtual engine speed calculation unit 500 calculates the virtual engine speed when the shift position Gp acquired in the step S120 is replaced with a value corresponding to the virtual gear stage mode on one stage lower, as the expected engine speed Ned.

Figure 12:
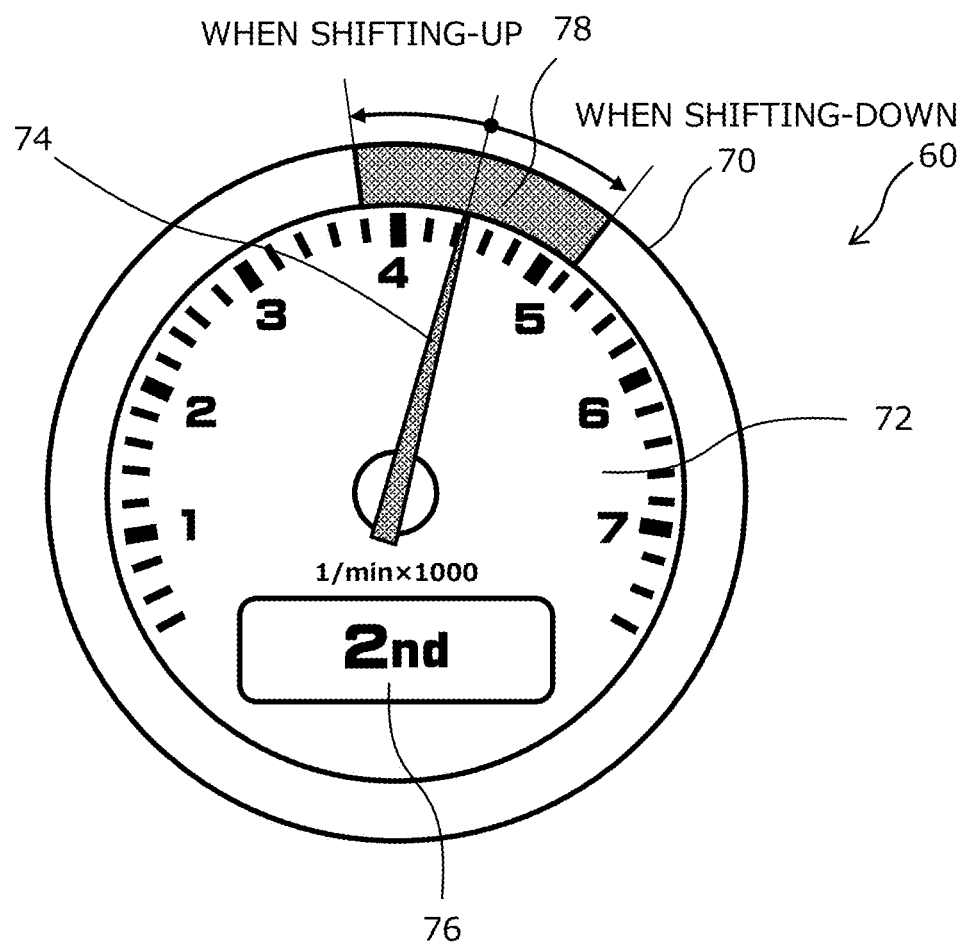
FIG. 12 is a diagram showing an example of the tachometer displayed on the instrument panel.

In the next step S128, the calculated expected engine speeds Neu, Ned are displayed on the instrument panel 60. FIG. 12 is a diagram showing an example of the tachometer displayed on the instrument panel. In the example shown in FIG. 12, the tachometer 70 is provided on the instrument panel 60. The tachometer 70 includes the dial 72, the meter needle 74, the display part 76, and an expected engine speed display part 78. The dial 72, meter needle 74, and display part 76 shown in FIG. 12 have the same configuration as the dial 72, the meter needle 74, and the display part 76 shown in FIG. 9. The expected engine speed display part 78 displays the expected engine speeds Neu and Ned by emitting light in a band shape along the outer periphery of the dial 72. In the example shown in FIG. 12, the following is indicated.

a) the current shift position Gp is the 2nd gear.
b) the virtual engine speed Ne pointed to by the meter needle 74 is 4400 rpm.
c) the expected engine speed Ned when the shift position Gp is shifted down from the 2nd gear to the 1st gear is 5200 rpm.
d) the expected engine speed Neu when the shift position Gp is shifted up from the 2nd gear to the 3rd gear is 3800 rpm.

According to the electric vehicle 10 configured as described above, the driver can perform the manual gear change operation while referring to the expected engine speed Ned, Neu displayed on the tachometer 70 of the instrument panel 60. As a result, it is possible to perform a smooth manual gear change operation, and the driver convenience is further increased.

2-3. Modification of Electric Vehicle of Second Embodiment

The electric vehicle 10 of the second embodiment may adopt modified examples as described below. Although several modified examples will be described below, these modified examples may be combined in the structure as appropriate.

2-3-1. First Modified Example

The embodiment of the expected engine speed display part 78 of the tachometer 70 is not limited to that shown in FIG. 12. For example, the expected engine speed display part 78 may be configured to display numerical values in a digital display format. Further, when the instrument panel 60 is constituted by a liquid crystal display, the tachometer 70 may be configured as an image displayed on the liquid crystal display.

2-3-2. Second Modified Example

The expected engine speed display control is to display the expected engine speeds Ned and Neu during the period when the clutch pedal 28 is depressed, but it may be possible to display the expected engine speeds Ned and Neu at all times. In this case, in the control routine shown in FIG. 11, the processing of step S122 may be skipped after the processing of step S120, and the routine may proceed to the processing of step S124. According to such control, the driver can always refer to the expected engine speed Ned, Neu.

2-3-3. Third Modified Example

In the expected engine speed display control, both the expected engine speed Neu when shifted up and the expected engine speed Ned when shifted down are displayed. However, in the expected engine speed display control, the expected engine speed corresponding to the virtual gear stage mode after the operation may be displayed in response to the actual operation of the shift lever 26 during the period in which the clutch pedal 28 is depressed. Such control, for example, after the processing of the step S122 in the control routine shown in FIG. 11, the presence or absence of the actual shift up or down based on the shift operation signal may be determined, and the corresponding expected engine speed of the virtual gear stage mode after the change may be calculated and displayed.

3. Third Embodiment

3-1. Configuration of Electric Vehicle of Third Embodiment

The configuration of the electric vehicle of the third embodiment is the same as the electric vehicle 10 of the first embodiment shown in FIG. 1 Further, the configuration of the tachometer displayed on the instrument panel of the electric vehicle of the third embodiment is the same as the tachometer 70 of the second embodiment shown in FIG. 12. Therefore, a detailed description of the electric vehicle 10 and the tachometer 70 of the third embodiment will be omitted.

3-2. Features of Electric Vehicle of Third Embodiment

Generally, the manual gear change operation during acceleration of the vehicle is often a shift up, and the manual gear change operation during deceleration is often a shift down. Therefore, in the expected engine speed display control of the electric vehicle 10 according to the third embodiment, the expected engine speed Neu is displayed in preparation for the shift-up operation in the manual gear change operation during acceleration, and the expected engine speed Ned is displayed in preparation for the shift-down operation in the manual gear change operation during deceleration. Hereinafter, the specific processing of the expected engine speed display control of the third embodiment will be described below with reference to the flowchart.

Figure 13:
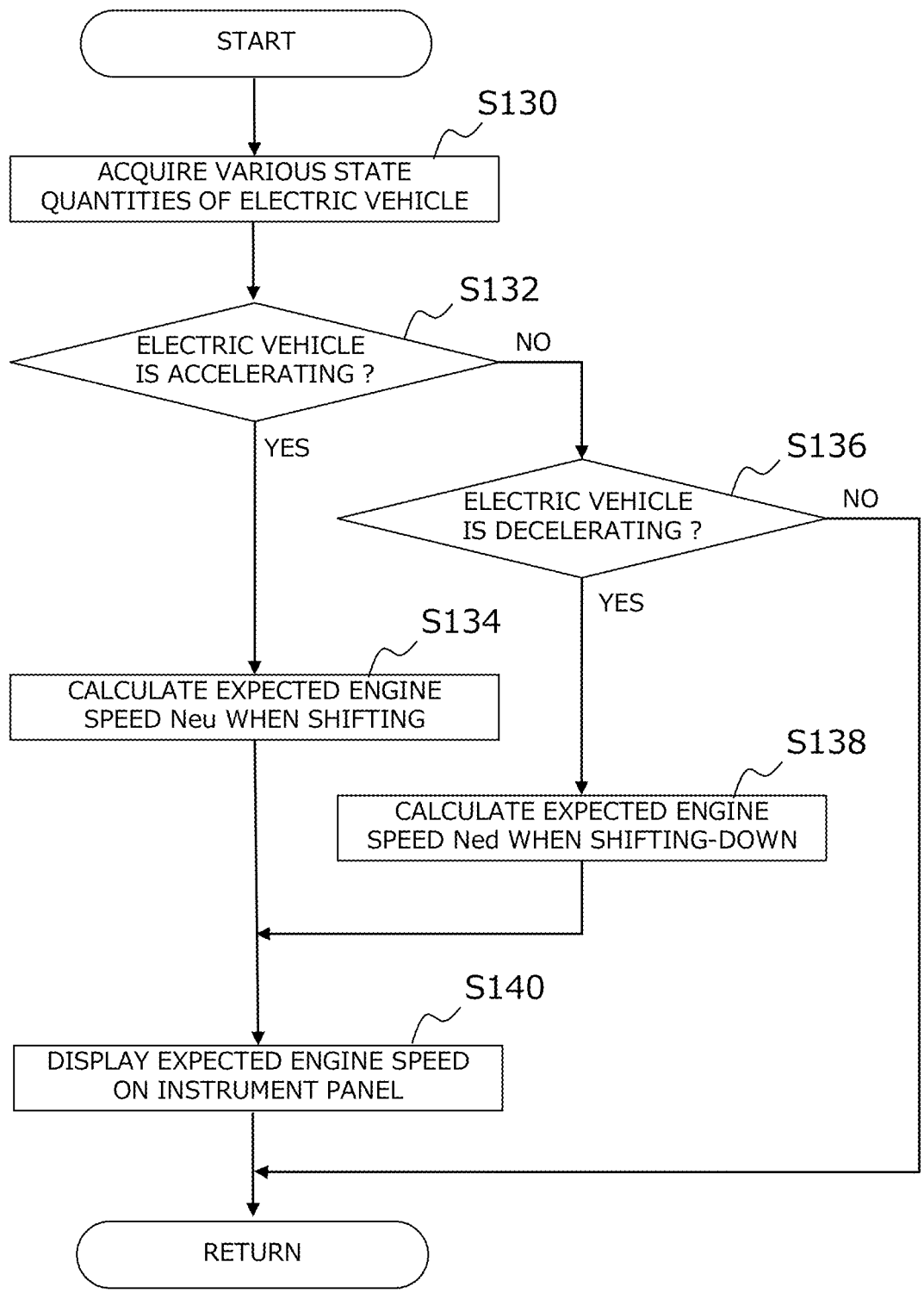
FIG. 13 is a flowchart showing a control routine for executing the expected engine speed display control according to a third embodiment.

FIG. 13 is a flowchart showing a control routine for executing the expected engine speed display control according to the third embodiment. The control routine shown in FIG. 13 is repeatedly executed by the ECU 50 in a predetermined control cycle while the electric vehicle 10 is traveling.

First, in the step S130, various state quantities of the electric vehicle 10 are acquired. Here, the ECU 50 executes the same process as that of the step S120. In the next step S132, it is determined whether the electric vehicle 10 is accelerating. Here, the ECU 50 determines, for example, whether the change amount of the shaft rotational speed Np is larger than 0. Then, when it is determined that the electric vehicle 10 is accelerating, the process proceeds to step S134, and when it is determined that the electric vehicle 10 is not accelerating, the process proceeds to step S136.

In the step S134, the expected engine speed Neu is calculated when the virtual gear stage mode of the shift lever 26 is shifted up to the virtual gear stage mode on one stage higher (e.g., from the 3rd gear to the 4th gear) in the present operating state. Specifically, the same process as the step S124 is executed. When the processing of step S134 is completed, the processing proceeds to step S140.

In the step S136, it is determined whether the electric vehicle 10 is decelerating. Here, the ECU 50 determines, for example, whether the change amount of the shaft rotational speed Np is smaller than 0. As a result, when it is determined that the electric vehicle 10 is decelerating, the process proceeds to step S138, and when it is determined that the electric vehicle 10 is not decelerating, the present routine is terminated.

In the step S138, the expected engine speed Ned is calculated when the virtual gear stage mode of the shift lever 26 is shifted down to the virtual gear stage mode on one stage lower (e.g., from the 3rd gear to the 2nd gear) in the present operating state. Specifically, the same process as the step S126 is executed. When the processing of step S138 is completed, the processing proceeds to step S140.

Figure 14:
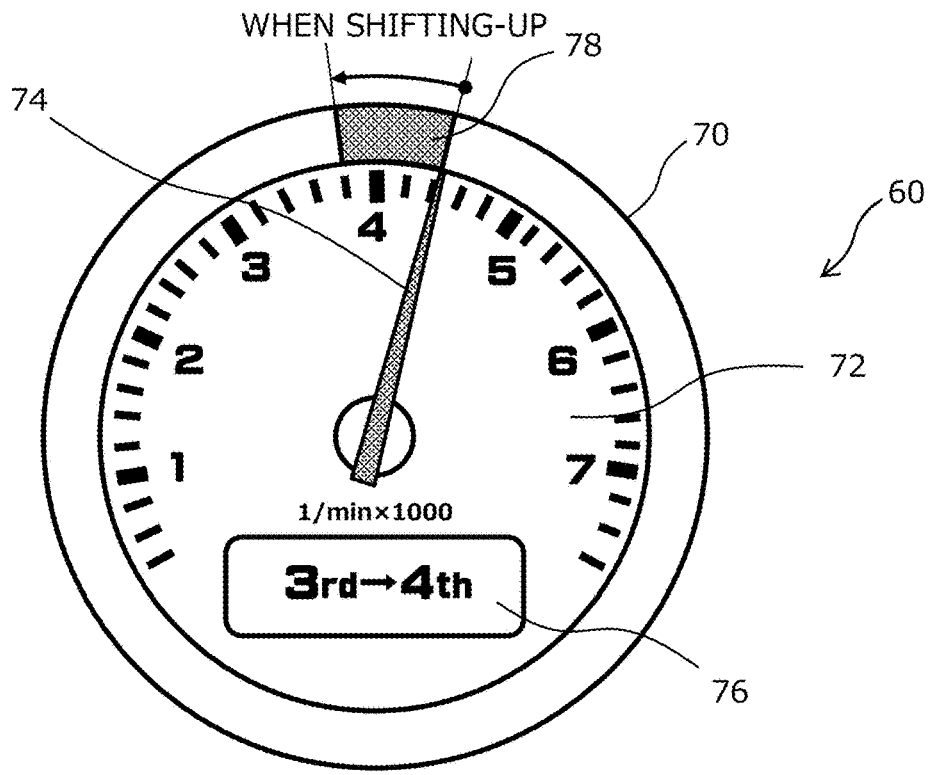
FIG. 14 is a diagram illustrating an example of the tachometer displayed on the instrument panel during acceleration.

In the next step S140, the expected engine speed Neu calculated in the step S134 or the expected engine speed Ned calculated in the step S138 is displayed on the instrument panel 60. FIG. 14 is a diagram illustrating an example of the tachometer displayed on the instrument panel during acceleration. The expected engine speed display part 78 displays the expected engine speed Neu by emitting light in a band shape along the outer periphery of the dial 72. In the example shown in FIG. 14, the following is indicated.

a) the current shift position Gp is 3rd gear.
    b) the virtual engine speed Ne pointed to by the meter needle 74 is 4400 rpm.
    c) the expected engine speed Neu when the shift position Gp is shifted up from 3rd gear to 4th gear is 3800 rpm.

Figure 15:
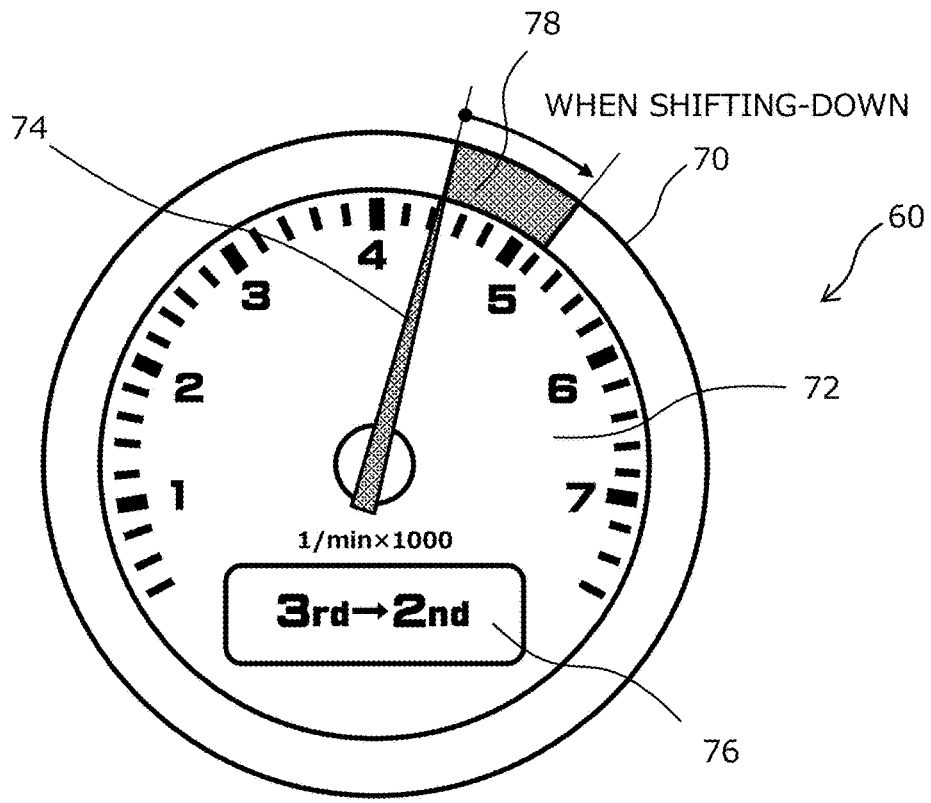
FIG. 15 is a diagram showing an example of the tachometer displayed on the instrument panel during deceleration.

FIG. 15 is a diagram showing an example of the tachometer displayed on the instrument panel during deceleration. In the example shown in FIG. 15, the following is indicated.

a) the current shift position Gp is 3rd gear.
    b) the virtual engine speed Ne pointed by the meter needle 74 is 4400 rpm.
    c) the expected engine speed Ned when the shift position Gp is downshifted from 3rd gear to 2nd gear is 5200 rpm.

When the process of step S140 is completed, the routine is terminated.

According to the electric vehicle 10 configured as described above, the expected engine speed corresponding to the manual gear change operation that is expected to be performed by the driver is displayed. This allows the driver to perform the manual gear change operation with reference to the expected engine speed indicated on the tachometer 70 of the instrument panel 60. As a result, the convenience of the driver can be further enhanced in the manual gear change operation.

3-3. Modification of Electric Vehicle of Third Embodiment

The electric vehicle 10 of the third embodiment may adopt modified examples as described below. Although several modified examples will be described below, these modified examples may be combined in the structure as appropriate.

3-3-1. First Modified Example

Figure 16:
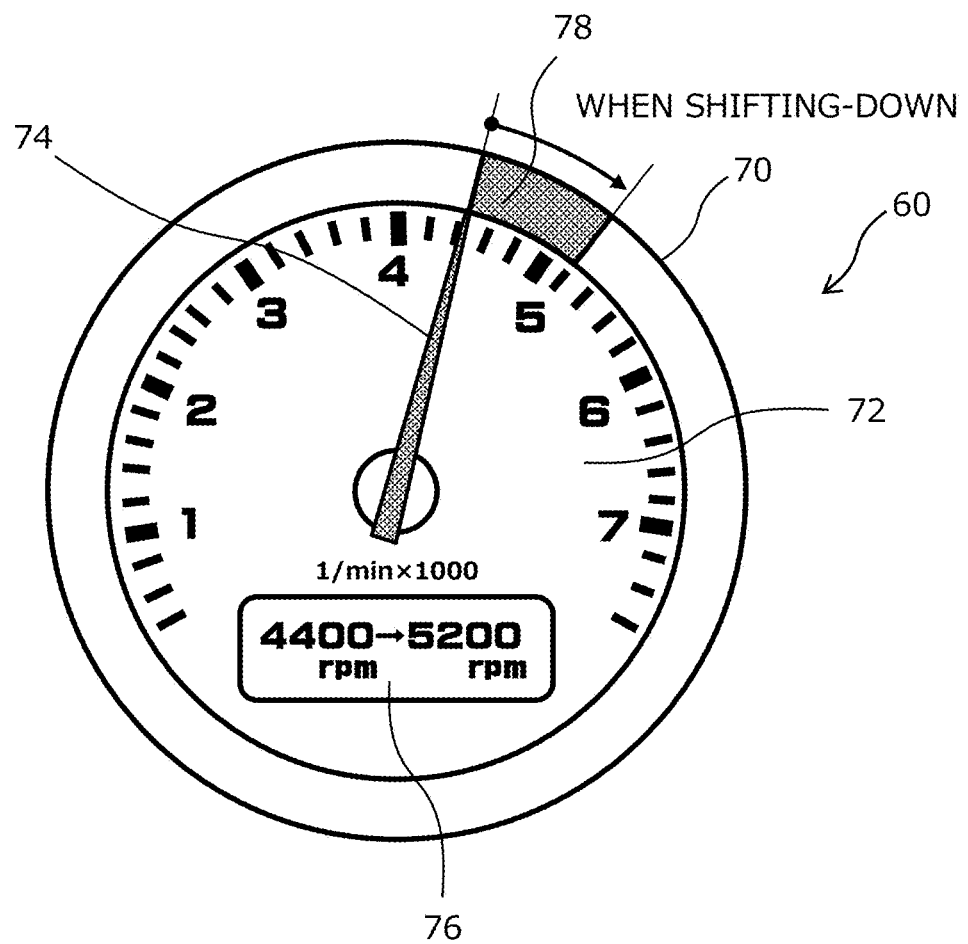
FIG. 16 is a diagram showing another example of the tachometer displayed on the instrument panel.

The embodiment of the expected engine speed display part 78 of the tachometer 70 is not limited to that shown in FIG. 12. For example, the expected engine speed display part 78 may be configured to display numerical values in a digital display format. FIG. 16 is a diagram showing another example of the tachometer displayed on the instrument panel. In the example shown in FIG. 16, the current virtual engine speed Ne and the expected engine speed Ned after downshifting are also displayed on the display part 76. Further, when the instrument panel 60 is constituted by a liquid crystal display, the tachometer 70 may be configured as an image displayed on the liquid crystal display.

3-3-2. Second Modified Example

The determination in step S132 may employ other known techniques for determining during acceleration of the electric vehicle 10. Other known techniques for determining during acceleration of the electric vehicle 10 may also be employed for the determination in step S136.

3-3-3. Third Modified Example

In the expected engine speed display control of the third embodiment, an example in which the expected engine speed Ned and Neu are always displayed during acceleration or deceleration of the electric vehicle 10 has been described. However it may be configured to display the expected engine speeds Ned and Neu only during the manual gear change operation. In this case, the determination processing of step S122 may be executed prior to the processing of step S140.

What is claimed is:

1. An electric vehicle that includes an electric motor for transmitting torque to a wheel of the vehicle, and that does not include: (i) an internal combustion engine, (ii) a transmission connected to the internal combustion engine, and (iii) a clutch mechanism connected to the internal combustion engine, the electric vehicle comprising:

a pseudo-shifter configured to be operated by a driver of the vehicle to select an arbitrary virtual gear stage mode among a plurality of virtual gear stage modes in which torque characteristics of the electric motor differ in stages with respect to a rotational speed of the electric motor;

a pseudo-clutch configured to be operated by the driver of the vehicle when the pseudo-shifter is operated and configured to simulate an operation of the clutch mechanism; and a controller configured to control the electric vehicle, wherein the controller is configured to:

execute a calculation process of calculating a virtual engine speed, which is a rotation speed of a virtual engine when a torque transmitted from the electric motor to the wheel is assumed to be the torque transmitted from the virtual engine to the wheel via a virtual clutch mechanism and a virtual transmission, based on the virtual gear stage mode selected by the pseudo-shifter and an operation amount of the pseudo-clutch, the virtual engine speed being calculated according an equation "Ne=Npx(1/r)×slip," where "Ne" is the virtual engine speed, "NP" is a shaft rotational speed of a propeller shaft connected to the electric motor, "r" is a gear ratio corresponding to the virtual gear stage mode selected by the pseudo-shifter, and "slip" is a slip ratio of the virtual clutch mechanism calculated from the operation amount of the pseudo-clutch, and generate an engine sound corresponding to the virtual engine speed and an engine selected by a driver of the electric vehicle from among several selectable engines, for output by a speaker of the electric vehicle.

* * * * *